US005603239A

United States Patent [19]

Chong

[11] Patent Number: 5,603,239

[45] Date of Patent: Feb. 18, 1997

[54] GYROSCOPIC VIRTUAL COUNTERWEIGHT FOR CRANES

[76] Inventor: Kerwin D. W. Chong, 98-1230 Pakalana St., Aiea, Hi. 96701

[21] Appl. No.: 523,343

[22] Filed: Sep. 5, 1995

[51] Int. Cl.[6] .............. G01C 19/02; B66C 23/72

[52] U.S. Cl. .............. 74/5.22; 212/195; 414/719

[58] Field of Search .............. 74/5.22; 212/195; 901/48; 414/719; 16/1 C

[56] References Cited

U.S. PATENT DOCUMENTS

Re. 13,755 6/1914 Forbes .............. 74/5.22
3,799,358 3/1974 Putnam .............. 212/242 X

*Primary Examiner*—Allan D. Herrmann
*Attorney, Agent, or Firm*—Michael I. Kroll

[57] ABSTRACT

A large gyroscope adapted to be used in place of, or in addition, to the counterweights normally used on a crane to keep it from tipping when hoisting a load. The gyroscope is of fixed mass such that all road permits and restrictions can be satisfied without stripping the crane. Once on site, the crane will accelerate its gyroscope to a predetermined number of revolutions per minute (steady state). To induce the gyroscopic moment to counter the tipping moment under load, a motor will rotate the gyroscope with respect to the precession axis, thus inducing a gyroscopic moment. Theoretically, any amount of counter weights can be simulated by controlling the precession rotation and spin of this fixed mass gyroscope.

16 Claims, 3 Drawing Sheets

Fig. 3
(PRESENT INVENTION)
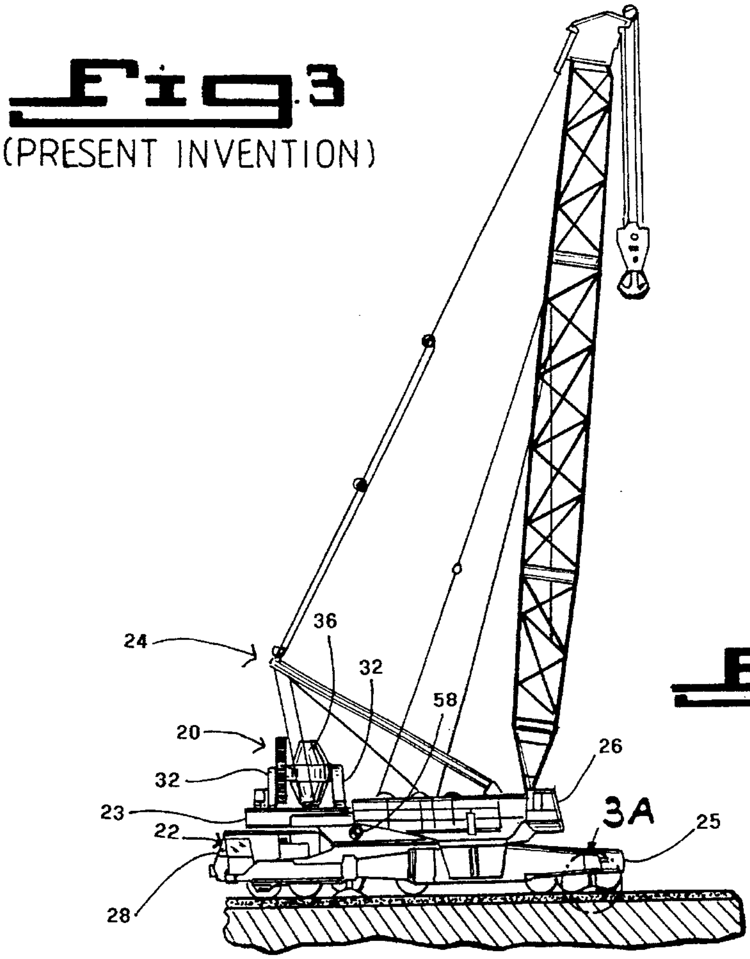
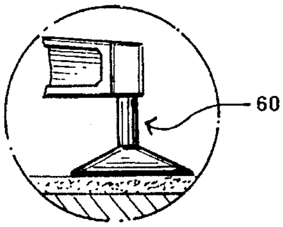
Fig. 3A
Fig. 4
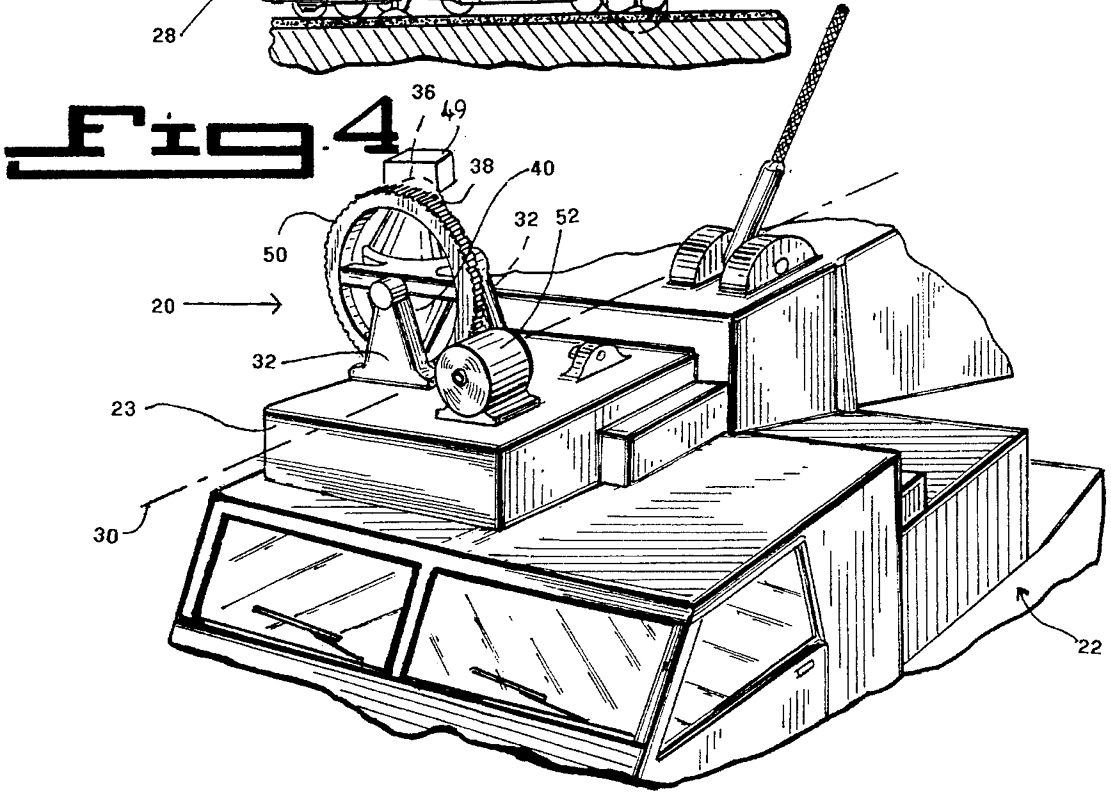

GYROSCOPIC VIRTUAL COUNTERWEIGHT FOR CRANES

BACKGROUND OF THE INVENTION

1. Field of the Invention

The instant invention relates generally to the counterweights of cranes, and more specifically it relates to a gyroscope to be used in place of, or in addition to, the counterweight of a crane.

2. Description of the Background Art

Cranes and other lifting machines often make use of counterweights in raising loads. The counterweight balances the weight of the load so that the machine's motor has only to move the load and not to support it. The counterweight may also stop the machine from tipping over as the load leaves the ground. In accordance with the principle of levers, a heavy counterweight placed near the fulcrum of a machine such as a crane has the same effect as a lighter counterweight positioned further away.

For example, once on site, the telescopic boom of a mobile crane can swivel around and extend far outward, secured by the counterweight at the rear of the upper carbody. As another example, the heavy counterweight at the rear of a fork-lift truck helps raise a load high into the air by preventing the truck from toppling forward. In all these cases, the heavier the load to be lifted, the heavier the counterweight must be, or the further the counterweight must be from the fulcrum.

As cranes get larger, counterweight tailswing must be addressed in tight areas. There is an increasing demand for enhancement attachments to cranes to increase the picking capacity of cranes. Most attachments either move the tipping point toward the load or move the counterweights farther back from the fulcrum to increase lifting capacity, based on the "simple beam" model. In both of these scenarios, counterweight is a major consideration.

Numerous counterweights for cranes have been provided in the prior art. However, while these units may be suitable for the particular purpose to which they address, they would not be as suitable for the purposes of the present invention as hereinafter described.

SUMMARY OF THE INVENTION

As indicated above, most enhancement devices on the market for cranes either move the "tipping point" toward the load or move the counterweights away from the fulcrum to increase lifting capacity. These devices have considerable disadvantages: counterweights are heavy and are awkward to ship or haul; the considerable distance of the counterweight from the fulcrum ("counterweight tailswing") makes it difficult to work in tight spaces; As the crane is maneuvered, the rear or tail of the crane swings requiring more caution in its use and larger working areas. Further, many highways have weight restrictions which greatly increase the cost of transporting the counterweights.

Accordingly, the above problems and difficulties are obviated by the present invention which provides for a crane to be equipped with a large gyroscope to be used in place of, or in addition, to counterweights. The gyroscope will be of fixed mass such that all road permits and restrictions can be satisfied without stripping the crane. As an example, once on site, the crane will accelerate its gyroscope to about 1000 revolutions per minute (steady state). To induce the gyroscopic moment to counter the tipping moment under load, the crane will rotate the gyroscope with respect to the precession axis, thus inducing a gyroscopic moment. Theoretically, any amount of counter weights can be simulated by controlling the precession rotation and spin of this fixed mass gyroscope.

The torque, M, which a spinning gyroscope exerts about its torque axis when it is made to precess about its precession axis, when the spin velocity is much larger than the precession velocity, is given by the following equation in cross product form:

$$M=I\Omega\times P$$

where $I=mr^2$=moment of inertia of the gyroscope about its spin axis $\Omega$=precession velocity P=spin velocity of the gyroscope m=total mass of gyroscope r=radius of gyration For example, if a vertically mounted gyroscope of mass 26,000 pounds and 4.756 feet radius of gyration is caused to rotate at 960 RPM about its spin axis, and then is precessed about its precession axis at 0.320 radians per second, it will exert a torque about its torque axis of 588,000 ft. lb.

If, it is required that this torque of 588,000 ft. pounds counterbalance a load of 60,000 pounds, then the moment arm (distance from the point of application of the torque to the load) would have to be 588,000 ft. pounds/60,000 pounds=9.8 feet. Hence a gyroscope operated as above would produce the same moment as a 30 ton counterweight at the end of a 9.8 foot moment arm. Thus, instead of using a 30 ton counterweight at the end of a 9.8 foot moment arm, as in the prior art, one can use a 13 ton gyroscope when operated as above.

Thus, a primary object of the present invention is to provide a gyroscopic virtual counterweight device for cranes that will overcome the shortcomings of the background art devices.

Another object is to provide a device that allows a crane to work in areas where space is severely restricted.

Yet another object is to provide a device that is much lighter and thus much easier and much more economical to haul and ship than the counterweights of a crane and yet have the same utility.

An additional object is to provide a device which allows a crane to generate its own counterweights as required by the simple measure of increasing gyroscope spin.

A further object is to allow the construction of cranes which will have lower shipping weights and that will not require assist equipment to install counterweights.

A still further object is to allow the manufacture of cranes with a much shorter tailswing than existing models.

Yet another object is to allow the much lighter cranes which utilize the instant invention to be hauled over roads hitherto inaccessible to them due to weight restriction regulations on these roads.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 3 is a diagrammatic elevational view of the instant invention installed on a crane as a replacement for the counterweight used on the background art cranes.

FIG. 3A is a diagrammatic enlarged view with parts broken away taken in the area of the dotted encirclement indicated by arrow 3A in FIG. 3 illustrating an outrigger near the front end of the crane in greater detail.

FIG. 4 is a diagrammatic perspective view with parts broken away of the instant invention mounted on a platform at the rear of the upper carbody of the crane.

DETAILED DESCRIPTION OF THE PREFERRED EMBODIMENTS

Figure 1:
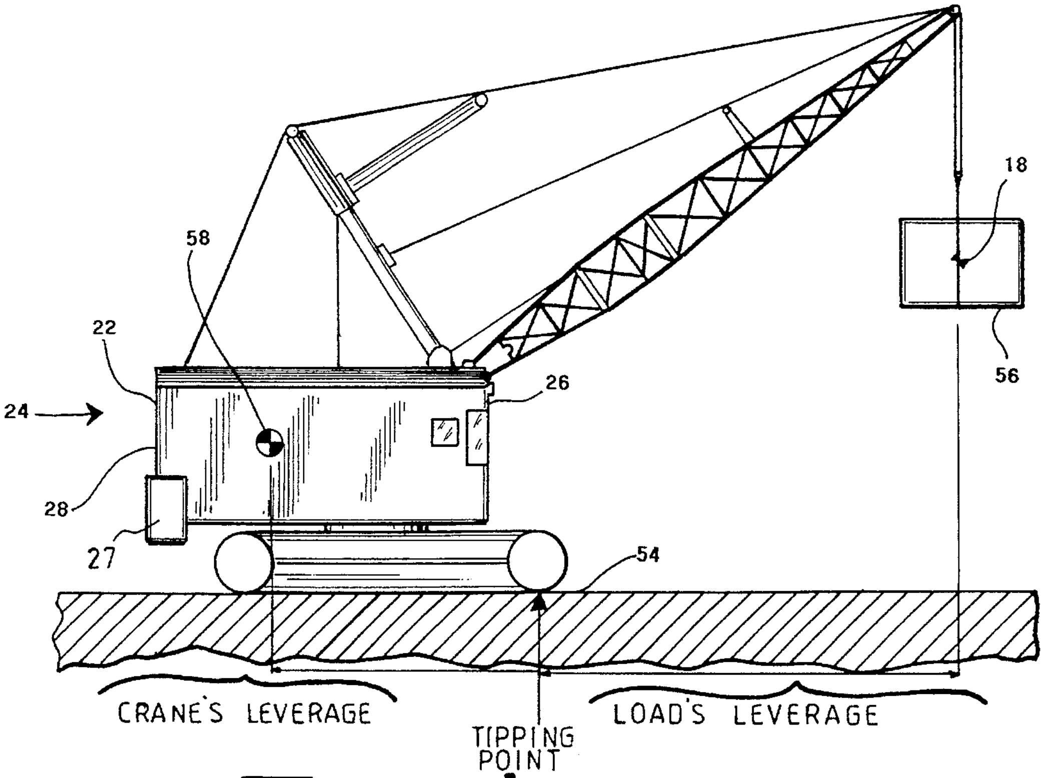
Fig. 1 (PRIOR ART)
FIG. 1 is a diagrammatic side elevational view of the background art showing a crane with a heavy counterweight installed.

Turning now descriptively to the drawings, in which similar reference characters denote similar elements throughout the several views, FIG. 1 illustrates a crane 24 of the background art equipped with a counterweight 27 causing the center of gravity of the unloaded crane to be at reference numeral 58. The tipping point 54 is at the point where the front idler of the crane is tangent to the ground and is the fulcrum about which the crane will tip if it attempts to hoist too heavy a load. It is imperative that the crane's leverage (the horizontal distance from the unloaded crane's center of gravity 58 to the tipping point 54 times the weight of the unloaded crane) be greater than the load's leverage (the horizontal distance from the tipping point 54 to the center of gravity 18 of the load 56 times the weight of the load 56).

Figure 2:
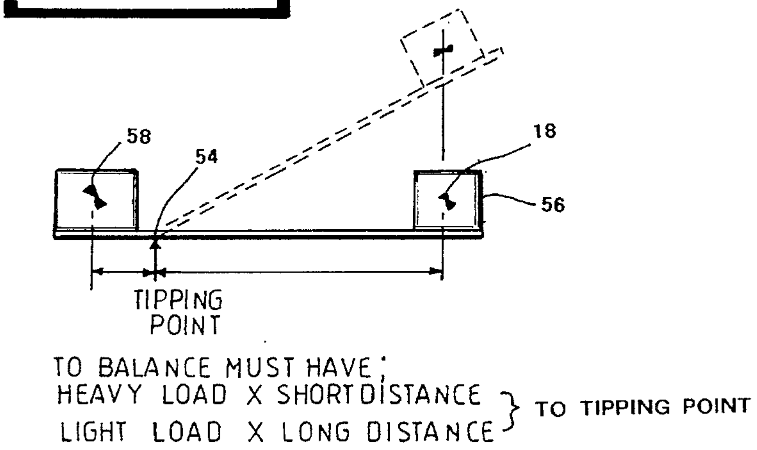
Fig. 2 (PRIOR ART)
FIG. 2 is a schematic view of the lever principle utilized by the cranes of the background art to counterbalance the heavy load it is desired to elevate.

FIG. 2 illustrates the leverage principle utilized by cranes equipped with the counterweights of the background art. As indicated, for a crane to properly balance the load being hoisted, the weight of the counterweights required must be properly selected for the required configuration of crane weight, load weight, and the horizontal distances from the tipping point 54 to the center of gravity 58 of the unloaded crane 24 and from the tipping point 54 to the center of gravity 18 of the load 56.

FIG. 3 shows the instant invention mounted on the upper carbody 23 of a crane 24. The upper carbody of the crane is rotatably attached to the lower carbody, and, in operation, the upper carbody can rotate 360 degrees with respect to the lower carbody of the crane. During operation, the lower carbody 25 of the crane 24 is supported by a plurality of outriggers 60 as shown in FIG. 3A.

Figure 5:
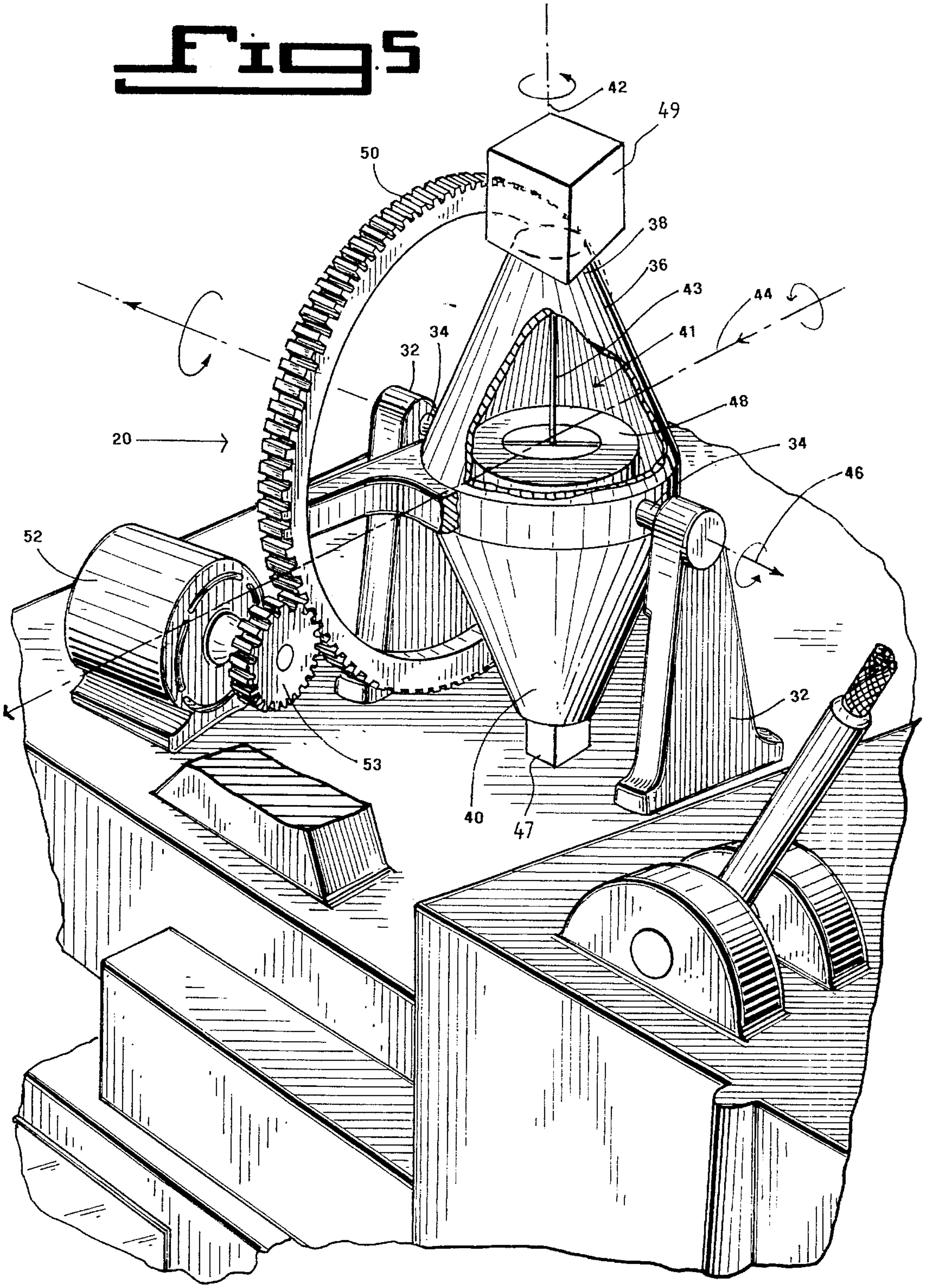
FIG. 5 is a perspective view of the instant invention depicting the three pertinent axes thereof, and showing the gyroscope being precessed in order to produce a counterforce to any tendency of the crane to tip while hoisting a load.

As shown in FIGS. 3–5, the gyroscopic virtual counterweight device 20 is mounted on the upper carbody 23 of the crane 24. An upper carbody 23 can be considered as having a load end 26 and a rear end 28. Since the gyroscope virtual counterweight device 20 generates its own torque as its stabilizing gyroscope mass rotates, this device could feasibly be mounted anywhere on the upper carbody 23 of the crane. Preferably, however, the gyroscopic virtual counterweight device 20 is mounted near the rear end 28 of the upper carbody 23 of the crane 24 so that its weight will move the center of gravity 58 of the crane 24 closer to the rear end 28 of the upper carbody 23. It may be found in practice, however, more feasible and/or more economical to mount a plurality of smaller gyroscopic virtual counterweight devices on either side of the upper carbody instead of just mounting a single larger gyroscopic virtual counterweight device. This invention contemplates that possibility as well. As shown in FIG. 4, the central axis 30 of the crane 24 is an imaginary straight line which runs from the rear end 28 of the upper carbody 23 of the crane 24, passes over the center of gravity 58 of the unloaded crane 24, and through the load end 26 of the upper carbody 23 of the crane 24.

As shown in FIGS. 4 and 5, the gyroscopic virtual counterweight device 20 consists of a gyroscope 41 having a stabilizing gyroscope mass such as heavy fly wheel 48 rotatably mounted within gyroscope housing 36. The gyroscope wheel 48 is mounted in the gyroscope housing 36 in such manner that it is free to rotate about its spin axis 42. The gyroscope housing 36 is fixedly mounted on load axle 34 which is rotatably mounted between the two gyroscope housing mounts 32.

The two gyroscope housing mounts 32 are fixedly mounted on the upper carbody 23 of the crane 24 and are aligned with the central axis 30 of the crane 24.

As shown in FIG. 5, the gyroscope 41 has a spin axis 42, a torque axis 44, and a precession axis 46. (The precession axis is parallel to the longitudinal axis of the upper carbody.) The gyroscope 41 has a spinning state in which it spins with a spin velocity which can be varied as required. And the gyroscope 41 has a despun state in which it is at rest. The gyroscope 41 has a mass of weight such as wheel 48 fixedly mounted on gyroscope axle 43 which is rotatably mounted within the gyroscope housing 36. The wheel 48 is selected so that its weight will be commensurate with the parameters of the crane 24, the parameters of gyroscope operation (spin velocity, etc.) and the prospective weight of the load 56 it is required to hoist with the crane 24. Preferably, the weight of the gyroscope, the spin velocity and the precession velocity will be selected in such manner that the weight of the load 56 being lifted by the crane 24 is more than counterbalanced to leave some room for error.

Gyroscope 41 is driven by a gyroscope drive motor such as fly-wheel drive motor 49. The fly-wheel drive motor 49 is a conventional electric motor. Gyroscope 41 is mounted in gyroscope housing 36 in such a manner that the spin axis 42 of the gyroscope in its despun state is vertical and the torque axis 44 of the gyroscope 41 is aligned with the central axis 30 of the crane 24. It should be noted that when the gyroscope is in its spinning state, the spin axis, torque axis and moment axis are "normal", "orthogonal", or 90 degrees to each other. Preferably, the gyroscope housing 36 is weighted at its bottom 40 with counter-balance weight 47, to counter balance fly-wheel drive motor 49.

Precession gear 50 is fixedly mounted on the load axle 34 and is fixedly attached to the gyroscope housing 36. Thus, as it rotates, precession gear 50 causes the gyroscope housing 36 to rotate in the same direction.

As shown in FIG. 5, a precession gear drive motor 52 for driving the precession gear 50 at a predetermined precession velocity is mounted to the upper carbody 23. The precession gear drive motor 52 causes drive motor pinion gear 53 to rotate. As shown, the drive motor pinion gear 53 meshes with precession gear 50 and causes it to rotate. Thus, when the gyroscope 41 is in its spinning state and the precession gear drive motor 52 drives the precession gear 50, this causes the gyroscope 41 within the gyroscope housing 36 to precess and exert a torque on the torque axis 44, thus exerting a stabilizing force on the crane 24 as it lifts a heavy load 56.

In operation, the precession gear drive motor 52 causes drive motor pinion gear 53 to rotate, which, meshing with the precession gear 50, causes it to rotate at the desired precession velocity. The rotation of the precession gear 50 causes the gyroscope housing 36 to which it is fixedly attached to rotate in the same direction thus precessing the gyroscope 24 within the gyroscope housing 36 and causing it to exert a torque along the torque axis 44. This torque is such that it effectively counterbalances any tendency of the crane 24 to tip while hoisting a load 56.

LIST OF REFERENCE NUMBERS

18—center of gravity of the load
20—gyroscopic virtual counterweight device
22—carbody of crane
23—upper carbody of crane
24—crane
25—lower carbody of crane
26—load end of upper carbody
27—counter weight
28—rear end of upper carbody
30—central axis of crane (upper carbody)
32—gyroscope housing mount
34—load axle
36—gyroscope housing
38—top section of gyroscope housing
40—bottom section of gyroscope housing
41—gyroscope
42—gyroscope spin axis
43—gyroscope axle
44—gyroscope torque axis
46—gyroscope precession axis
47—counter-balance weight
48—rotatable mass of gyroscope (the fly-wheel)
49—fly-wheel drive motor
50—precession gear
52—precession gear drive motor
53—drive motor pinion gear
54—tipping point
56—load
58—center of gravity of unloaded crane
60—outrigger or stabilizer It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is desired to be protected by Letters Patent is set forth in the appended claims:

1. A gyroscopic virtual counterweight device for mounting on the upper carbody of a crane having a center of gravity, said crane having a loaded state and an unloaded state, said upper carbody having a load end and a rear end, said crane having a central axis running from the rear end and through the load end, said gyroscopic virtual counterweight device comprising:

a) a plurality of mounts aligned with the central axis of the crane and fixedly mounted on the upper carbody of a crane;

b) a load axle rotatably mounted between the mounts;

c) a gyroscope housing having a top section and a bottom section, said gyroscope housing being fixedly mounted on the load axle;

d) a gyroscope having a spin axis, a torque axis, and a precession axis, said axes being orthogonal to each other, said gyroscope having a spinning state wherein it spins with a predetermined spin velocity and a despun state, said gyroscope having a mass of predetermined weight mounted within the gyroscope housing, such that the spin axis of the gyroscope in its despun state is vertical and the torque axis of the gyroscope is aligned with the central axis of the crane;

e) a precession gear fixedly mounted on the load axle and fixedly attached to the gyroscope housing; and f) a precession gear drive motor for driving the precession gear at a predetermined precession velocity;

whereby when the gyroscope is in its spinning state and the precession gear drive motor drives the precession gear thus causing the gyroscope within the gyroscope housing to precess, a torque is exerted on the load axis, thus exerting a stabilizing force on the crane as it lifts a heavy load.

2. The gyroscopic virtual counterweight device of claim 1, further comprising a gyroscope drive motor for driving said mass of predetermined weight, wherein the gyroscope housing is weighted at the bottom thereof, thus counter balancing said gyroscope drive motor.

3. The gyroscopic virtual counterweight device of claim 1, wherein the weight of the gyroscope, the spin velocity and the precession velocity are selected such that the weight of the load being lifted by the crane is counterbalanced.

4. The gyroscopic virtual counterweight device of claim 3, wherein the precession gear drive motor has a drive motor pinion gear which meshes with the precession gear, whereby when said motor causes said pinion gear to rotate, the precession gear with which said pinion gear meshes rotates in the reverse direction thus rotating the gyroscope housing and causing the gyroscope mounted therein to precess.

5. The gyroscopic virtual counterweight device of claim 3, wherein the central axis of the crane passes through the center of gravity of the unloaded crane.

6. The gyroscopic virtual counterweight device of claim 4, wherein the central axis of the crane passes through the center of gravity of the unloaded crane.

7. The gyroscopic virtual counterweight device of claim 1, wherein the number of mounts is two.

8. The gyroscopic virtual counterweight device of claim 1, wherein the gyroscopic mass is a fly-wheel.

9. The gyroscopic virtual counterweight device of claim 1, wherein said device is mounted on the rear end of the upper carbody of the crane.

10. The gyroscopic virtual counterweight device of claim 1, wherein the precession gear drive motor has a drive motor pinion gear which meshes with the precession gear, whereby when said motor causes said pinion gear to rotate, the precession gear with which said pinion gear meshes rotates in the reverse direction thus rotating the gyroscope housing and causing the gyroscope mounted therein to precess.

11. The gyroscopic virtual counterweight device of claim 10, wherein the central axis of the crane passes through the center of gravity of the unloaded crane.

12. The gyroscopic virtual counterweight device of claim 1, wherein the central axis of the crane passes through the center of gravity of the unloaded crane.

13. A method of using a gyroscope having a predetermined weight to stabilize a crane for hoisting heavy loads, said crane having an upper carbody having a load end and a rear end, said method comprising mounting a gyroscope on the upper carbody, said gyroscope having a spin axis, a torque axis, and a precession axis, said axes being normal to each other, said gyroscope further having a spinning state wherein it spins at a predetermined spin velocity and a despun state, said method further comprising causing the gyroscope to precess at a predetermined precession velocity thus producing a torque, whereby the tendency of the crane to tip is counterbalanced.

14. The method of claim 13, wherein the torque axis of the gyroscope is aligned with the central axis of the upper carbody of the crane.

15. The method of claim 13, wherein the weight of the gyroscope, the spin velocity and the precession velocity are selected such that the weight of the load being lifted by the crane is counterbalanced.

16. The method of claim 13, wherein said gyroscope is mounted at the rear end of the upper carbody.

* * * * *